US011335303B2

(12) United States Patent
Jarvenpaa et al.

(10) Patent No.: US 11,335,303 B2
(45) Date of Patent: May 17, 2022

(54) GAZE DEPENDENT FOVEATED RENDERING APPARATUS, METHOD, COMPUTER PROGRAM AND SYSTEM

(71) Applicant: Nokia Technologies Oy, Espoo (FI)

(72) Inventors: Toni Jarvenpaa, Akaa (FI); Peter Eskolin, Pirkkala (FI); Tero Jokela, Tampere (FI); Marja Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/771,764

(22) PCT Filed: Dec. 19, 2017

(86) PCT No.: PCT/FI2017/050908
§ 371 (c)(1),
(2) Date: Jun. 11, 2020

(87) PCT Pub. No.: WO2019/122493
PCT Pub. Date: Jun. 27, 2019

(65) Prior Publication Data
US 2021/0174768 A1    Jun. 10, 2021

(51) Int. Cl.
*G09G 5/37*    (2006.01)
*G06F 3/01*    (2006.01)
*G06T 3/00*    (2006.01)

(52) U.S. Cl.
CPC .............. *G09G 5/37* (2013.01); *G06F 3/013* (2013.01); *G06T 3/0012* (2013.01); *G06F 3/012* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

| 6,182,114 B1* | 1/2001 | Yap ..................... G06F 16/9577 |
| | | 707/E17.121 |
| 6,664,955 B1 | 12/2003 | Deering |
| 10,574,938 B1* | 2/2020 | Trail ...................... H04N 5/345 |
| 10,586,342 B2* | 3/2020 | Bardagjy .............. G02B 27/425 |
| 10,971,115 B2* | 4/2021 | Sanders .................. G06F 3/147 |

(Continued)

FOREIGN PATENT DOCUMENTS

WO    WO 2017/053971 A1    3/2017

OTHER PUBLICATIONS

Guenter, Brian, et al., "Foveated 3D Graphics", Nov. 1, 12, ACM Transactions on Graphics, 10 pgs.

*Primary Examiner* — Jwalant Amin
(74) *Attorney, Agent, or Firm* — Joseph C. Drish; Harrington & Smith

(57) ABSTRACT

Certain examples of the present invention relate to an apparatus, method, computer program and system for use in gaze dependent foveated rendering. Certain examples provide an apparatus including at least one processor; and at least one memory including computer program code; the at least one memory and the computer program code configured to, with the at least one processor, cause the apparatus at least to perform adapting a gaze dependent foveated rendering process in response to a determination of a sub-optimal operational condition of the gaze dependent foveated rendering process.

20 Claims, 8 Drawing Sheets

(56) References Cited

U.S. PATENT DOCUMENTS

2016/0259977 A1* 9/2016 Asbun .................... G06F 3/013
2016/0302713 A1* 10/2016 Maruta ................. A61B 5/378
2017/0287446 A1 10/2017 Young et al.
2018/0096516 A1* 4/2018 Luebke .................. G06T 15/06
2018/0220119 A1* 8/2018 Horvitz ............... H04N 13/344

* cited by examiner

GAZE DEPENDENT FOVEATED RENDERING APPARATUS, METHOD, COMPUTER PROGRAM AND SYSTEM

CROSS REFERENCE TO RELATED APPLICATION

This patent application is a U.S. National Stage application of International Patent Application Number PCT/FI2017/050908 filed Dec. 19, 2017, which is hereby incorporated by reference in its entirety.

TECHNOLOGICAL FIELD

Examples of the present disclosure relate to an apparatus, method, computer program and system for use in gaze dependent foveated rendering. Some examples, though without prejudice to the foregoing, relate to an apparatus, method, computer program and system for error recovery in gaze dependent foveated rendering.

BACKGROUND

Conventional gaze dependent foveated rendering techniques are not always optimal. Conventional techniques require precise, accurate and reliable gaze detection/tracking and are not resilient to sub-optimal operational conditions or gaze detection/tracking errors.

It is useful to provide improved gaze dependent foveated rendering. It is useful to provide an apparatus, method, computer program and system for improved gaze dependent foveation rendering which may be resilient to sub-optimal operational conditions and which may manage sub-optimal operational conditions or errors in a gaze dependent foveation rendering process in a manner which is minimally perceivable/noticeable to a user.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to one or more examples of the disclosure there is provided an apparatus comprising:
at least one processor; and at least one memory including computer program code;
the at least one memory and the computer program code configured to, with the at least one processor, cause the apparatus at least to perform:
adapting a gaze dependent foveated rendering process in response to a determination of a sub-optimal operational condition of the gaze dependent foveated rendering process.

According to one or more examples of the disclosure there is provided a chipset, module, device, display device and/or near eye display device comprising the above apparatus.

According to one or more examples of the disclosure there is provided a system comprising the above apparatus; and eye tracker for determining a user's gaze position and a display for rendering gaze dependent foveated rendered content.

According to one or more examples of the disclosure there is provided a method comprising adapting a gaze dependent foveated rendering process in response to a determination of a sub-optimal operational condition of the gaze dependent foveated rendering process.

According to one or more examples of the disclosure there is provided a computer program that, when performed by at least one processor, causes the above method to be performed.

According to one or more examples of the disclosure there is provided a non-transitory computer readable medium encoded with instructions that, when performed by at least one processor, causes the above method to be performed.

According to one or more examples of the disclosure there is provided an apparatus comprising means for adapting a gaze dependent foveated rendering process in response to a determination of a sub-optimal operational condition of the gaze dependent foveated rendering process.

According to at least some aspects of the present disclosure, there are provided examples as claimed in the appended claims.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

Figure 1:
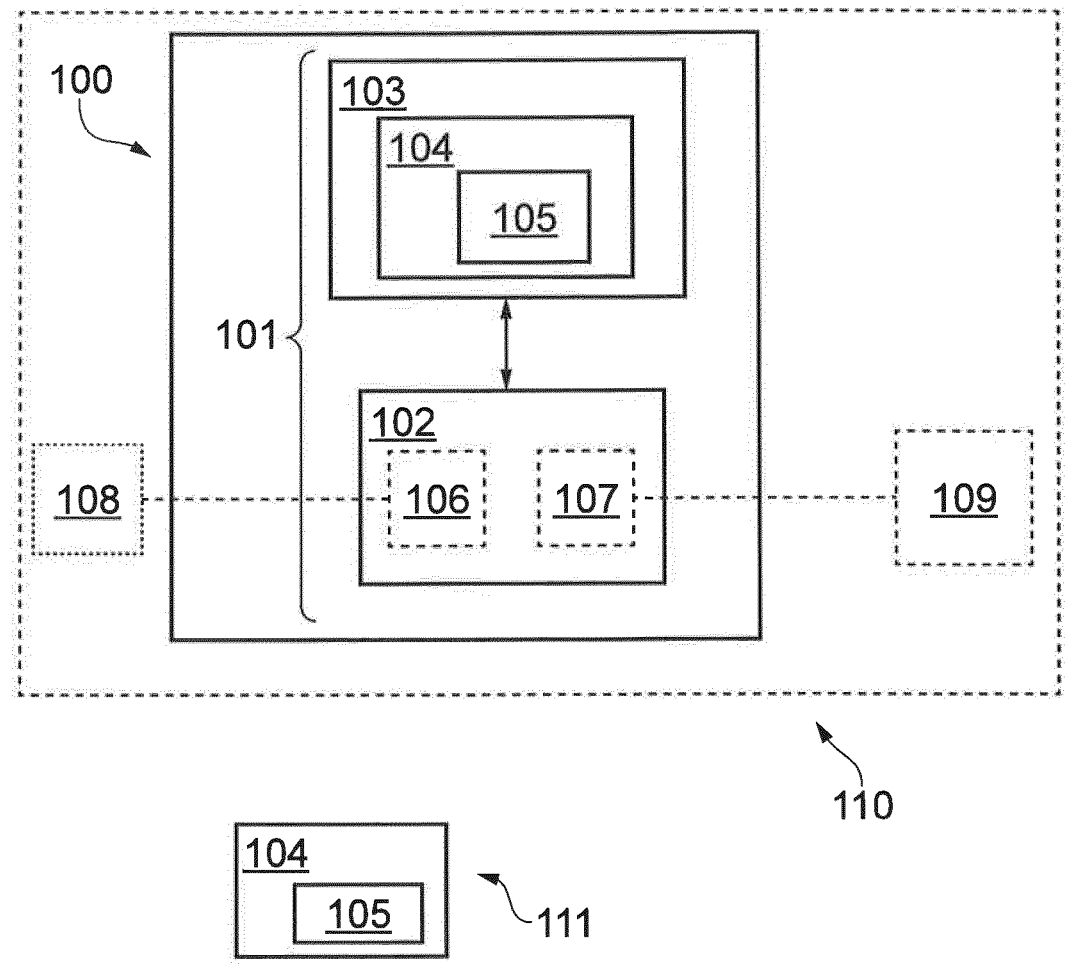
FIG. 1 schematically illustrates an apparatus.

The Figures are not necessarily to scale. Certain features and views of the figures may be shown schematically or exaggerated in scale in the interest of clarity and conciseness. For example, the dimensions of some elements in the figures may be exaggerated relative to other elements to aid explication. Similar reference numerals are used in the Figures where appropriate/possible to designate similar features. For clarity, all reference numerals are not necessarily displayed in all figures.

DETAILED DESCRIPTION

Foveated imaging, also known as space variant imaging, is an image processing and display technique in which a quality or detail of an image (e.g. not least for example its resolution, colour depth, compression level) varies over the image.

Figure 5A:
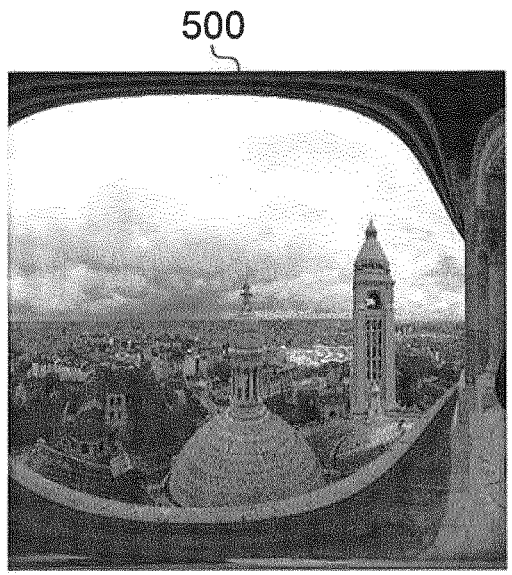
FIGS. 5A-6B illustrate examples of foveated imaging.
Figure 6A:
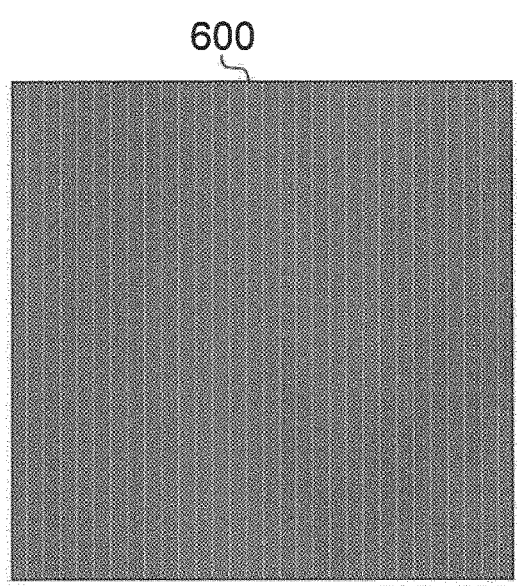
Figure 6B:
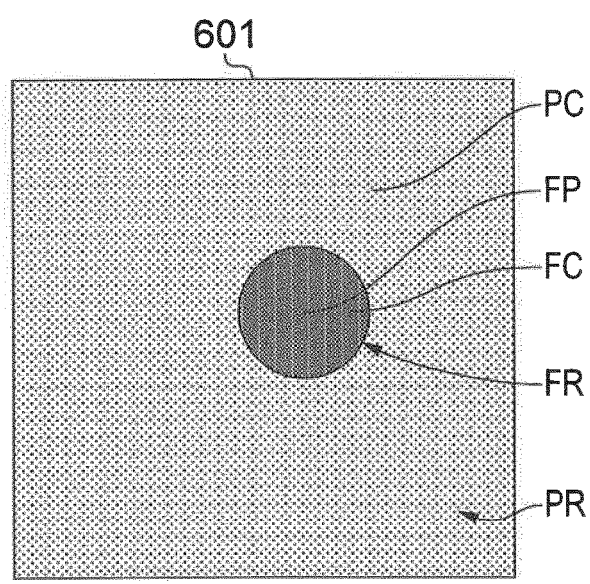

FIG. 5A illustrates a conventional/normal ("unfoveated") image 500 (FIG. 6A schematically illustrates the same), where the quality of the image 500, 600 is uniform throughout the image, i.e. the entire image is displayed at a high quality.

Figure 5B:
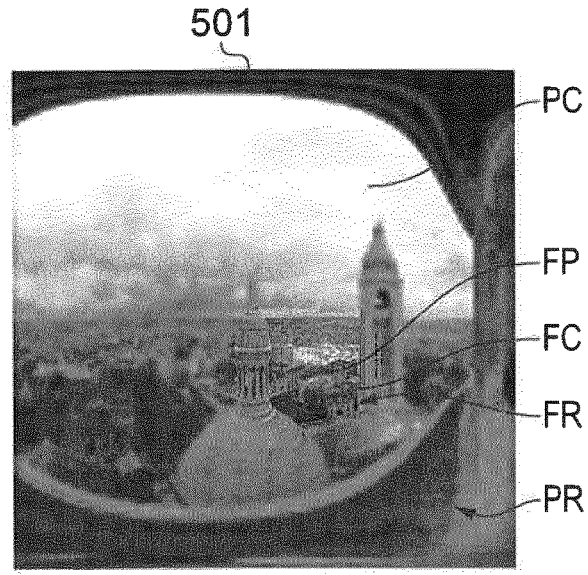

FIG. 5B illustrates a foveated image 501 (FIG. 6A schematically illustrates the same) in which a quality of the image 501, 601 varies over the image. A first region/zone of the image, referred to hereinafter as "foveation region" FR, is provided within which the image content, referred to hereinafter as "foveal content" FC, is displayed at a high quality. A second region/zone of the image outside of the first region, i.e. corresponding to the remaining portion of the image, referred to hereinafter as "peripheral region" PR, is provided within which the image content, referred to hereinafter as "peripheral content" PC, is displayed at a low quality. The foveation region FR is a region of the image that is displayed at a higher quality relative to the quality at which the remaining portion of the image/peripheral region PR, is displayed.

A point, "foveation position" FP, may be defined in the image. The foveation position represents a location, e.g. centre, of the foveation region FR. A user looking at the foveation region FR (i.e. such that the user's gaze position/fixation point/point of focus is aligned with the foveation point FP) perceives the foveation region via the centre of the user's eye's retina, the fovea/fovea centralis. The fovea is responsible for sharp central vision (also called foveal vision), where a user's visual acuity is at its greatest. Accordingly, the user perceives the foveation region FR via the user's sharp central vision and hence the user may be able to perceive the high quality image detail of the foveal content FC of the foveation region FR.

Outside of the foveation region FR, the remainder of the image, i.e. the peripheral content PC of the peripheral region PR, is displayed at a lower quality. A user, looking at the foveation region FR, such that the user's gaze position is aligned with the foveation point FP, perceives the peripheral region PR and its peripheral content PC via a peripheral/non-central region of the user's eye's retina, where the user's visual acuity is less. Accordingly, the reduced quality/detail of the peripheral content PCT of the peripheral region PR of the image may not be perceived/noticed by the user.

Foveated imaging may enable a reduction in computing resources (not least data processing, bandwidth and storage of image data) by reducing the quality of the image in a region of an image that is perceived by a viewer's peripheral vision (i.e. reducing the quality of the peripheral content of the peripheral region), wherein such a reduction in quality is less perceivable/noticeable than if it were perceived by the user's central/foveal vision. The quality of the image in another region of an image (namely quality of the foveal content of the foveation region) which is perceived by a viewer's central/foveal vision, is displayed at a (maintained or increased) higher quality, wherein such high quality content is perceivable/noticeable via the user's central/foveal vision.

In foveated imaging, the quality of differing regions of the image displayed may be adjusted to match the ability of the user's eyes to perceive the image quality at differing regions, e.g. high image quality in a foveation region perceived by the user's sharp central/foveal vision, and low image quality in a peripheral region perceived by a user's peripheral vision.

In conventional foveated imaging, the location of the foveation region/foveation point may be pre-determined or user specified, for example, by a user using a pointing device (such as computer mouse, when viewing a foveated image on a display). Alternatively, the foveation region/point may be specified via a user's gaze thereby providing gaze contingent foveated imaging, also known as gaze dependent foveated rendering.

In gaze dependent foveated rendering, the position of the foveation region within the image displayed on a display (and hence the position of the remaining/surrounding peripheral region within the image displayed on the display) dynamically varies in dependence upon a determined position of a user's gaze on the image displayed on the display. For example, the foveation point (which dictates the position of the foveation region) may be adjusted so as to correspond to the determined gaze position. Accordingly, the areas of the image where high quality foveal content is rendered and where low quality peripheral content is rendered dynamically vary in dependence upon the determined gaze position.

In a gaze dependent foveated rendering process, a gaze detector/eye tracker may be used to measure the user's eye's (relative) position and movement (e.g. via detection of certain features of the eye and/or corneal reflections or infrared (IR) glints from the user's eye) and determine the user's gaze direction/line of slight. This in turn may be used to determine and track a position of the user's gaze on an image displayed on a display (e.g. by determining where, on the image plane of the displayed image, the user's gaze direction/line of slight intersects the image plane).

Figure 7:
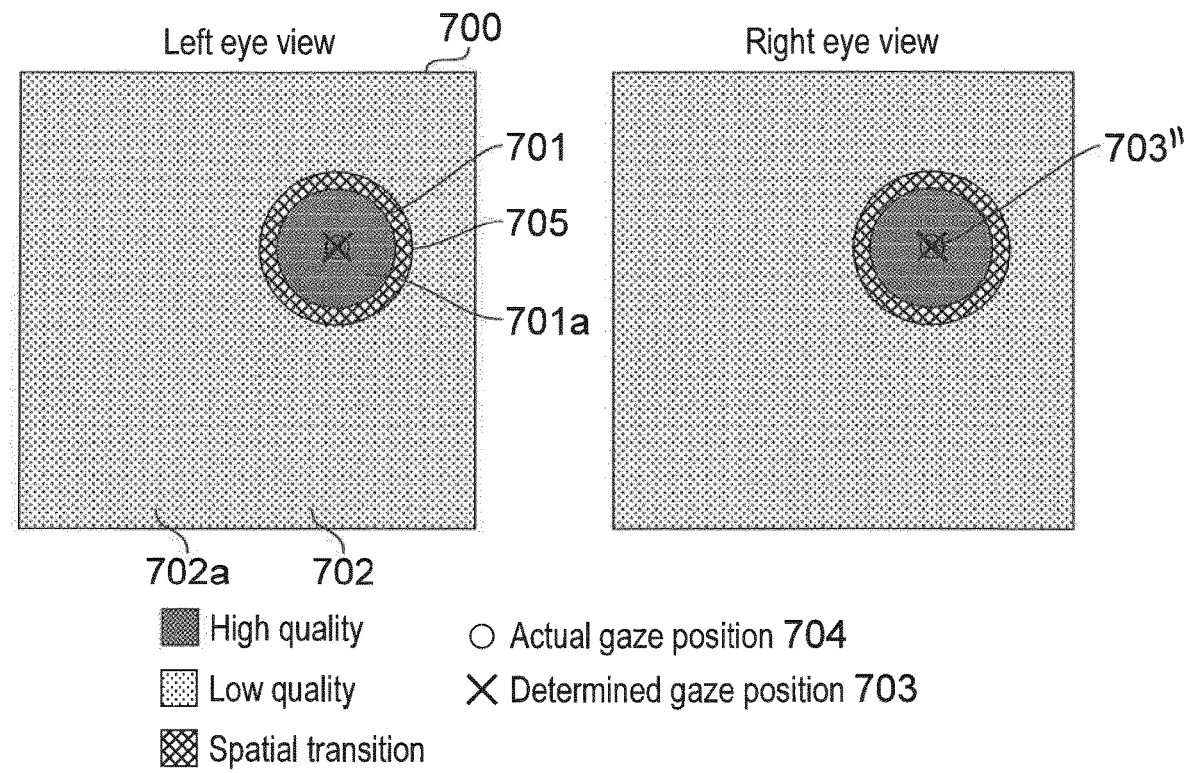
FIG. 7 schematically illustrates a gaze dependent foveated rendering process.

FIG. 7 illustrates an example of binocular gaze dependent foveated rendering. A gaze position 703 on an image 700 displayed on a binocular display is determined (and tracked, i.e. the gaze position is repeatedly determined at a particular rate/frequency) for each of a user's eyes.

The position of a first region, foveation region 701, is dependent upon the determined gaze position 703, for example, such that a foveation point (i.e. the centre/centroid of foveation region) is dynamically adjusted so as to correspond to the continually updated determined gaze position. Consequently, the position of a remaining second region, peripheral region 702 outside of the foveal region, is likewise also dependent upon the determined gaze position 703.

In the example shown, rather than simply having just two regions, a foveation region and a peripheral region (as per FIGS. 5A-6B), a further region is provided, a spatial transition region 705, which acts as a transition region to cross blend the differing image quality levels of the foveal content and the peripheral content in the respective foveal and peripheral regions. In some examples, there may be one or more transitional regions between the foveation region and the peripheral region. In some examples, there may be multiple "levels" of regions, e.g. nested regions (one inside the other) of: highest, high, mid-level, low, and lowest image quality content inside each region.

Under normal operational conditions, when the gaze dependent foveated rendering process (and the gaze tracking process thereof) is operating normally/optimally, as shown in FIG. 7, the determined gaze position 703 corresponds to the actual gaze position 704 of the user for each of the user's eye. I.e. under normal conditions, the determined gaze position 703 accurately/reliably corresponds to the actual gaze position 704.

Conventional gaze dependent foveated rendering techniques require precise, accurate and reliable gaze detection. Any sub-optimal operational conditions, such as failures in the gaze detection or errors in the determined gaze position (i.e. the determined gaze position not corresponding to the user's actual gaze position—as illustrated in FIG. 8), may give rise to incorrectly positioned first/foveation and second/peripheral regions such that the user may perceive the peripheral (low quality) content not via the user's peripheral vision but instead by the user's central foveal vision and hence a user may notice/perceive the low quality peripheral (low quality) content.

Figure 8:
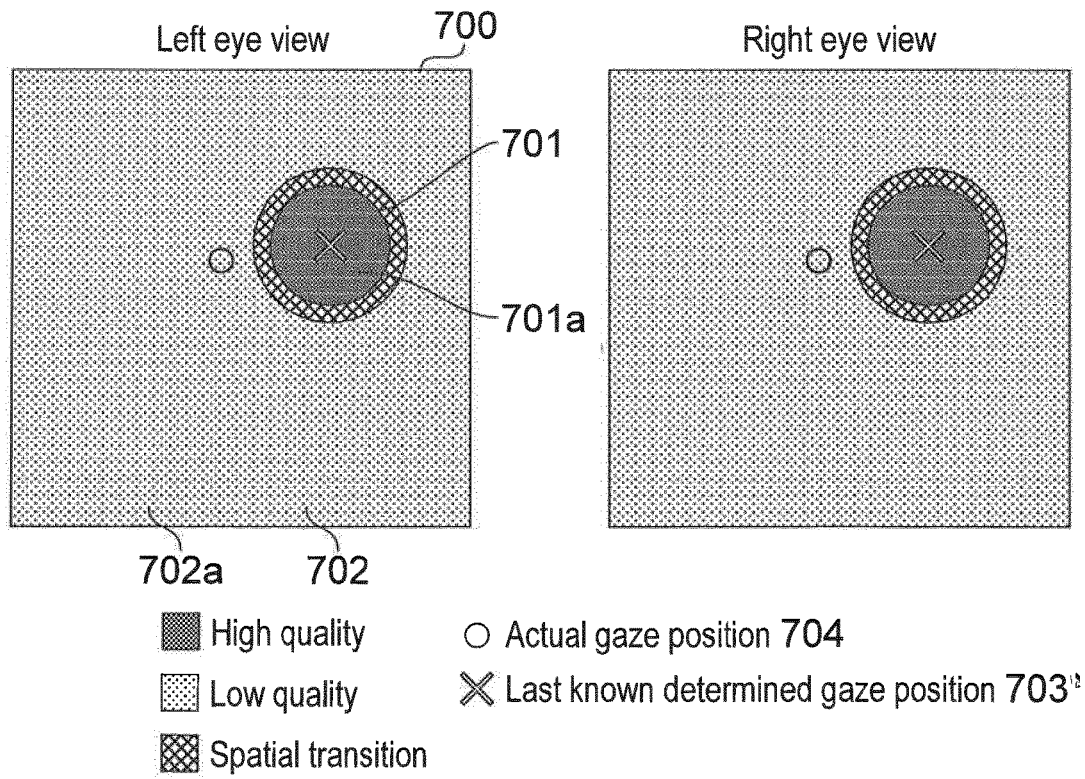
FIG. 8 schematically illustrates a sub optimal operational condition in a gaze dependent foveated rendering process.

FIG. 8 illustrates an example of a sub-optimal operational condition of a gaze dependent foveated rendering process. In this example, the determined gaze position 703' (or last known gaze position before an error/failure interrupting ongoing gaze position determination/tracking) does not correspond to the user's actual gaze position 704. In conventional gaze dependent foveated rendering techniques, following such a sub-optimal condition/error, the foveation position would not be updated to the new/correct actual gaze position of the user. In the illustrated example of FIG. 8, the user's actual gaze position 704 would thus be outside of the foveation region 701 and would instead now be within the peripheral region 702. Accordingly, the user would perceive the low quality peripheral content via the user's central/sharp foveal vision (rather that via the user's peripheral vision) and hence the user would be able to perceive/notice the lower quality peripheral content of the peripheral region.

Conventional gaze dependent foveated rendering techniques are not resilient to sub-optimal operational conditions or gaze tracking errors.

Suboptimal operation and failures may cause an observed quality reduction in the displayed content, for example:

- The peripheral low quality content may be displayed in the user's actual current gazed position (instead of the intended high quality foveal content being displayed in the user's actual current gazed position). This could lead to the user perceiving a low quality image.
- The foveation region may move rapidly around the visual field. This could lead to the user noticing unintentional changes in the foveated rendered content, possibly observed as motion or flicker.
- Unintended image changes especially in the peripheral region/peripheral visual field of the user might cause additional workload for the visual processing and/or trigger accidental and irritating saccadic eye movements of the user.

Without limiting the scope of the claims, an advantage/technical effect of certain, but not necessarily all, examples of the present disclosure may be to provide an improved and more resilient gaze dependent foveated rendering process that seeks to effect remedial action to ameliorate/compensate or recover from sub-optimal operational conditions (for example until such time as gaze detection/tracking is restored and normal operation may be resumed). Examples of the disclosure seek to provide such remedial action in an optimal manner that is minimally invasive/perceptible to the user and not unduly onerous in computing resources.

Examples of the present disclosure may take the form of an apparatus, a method, a computer program or a system. Accordingly, examples may be implemented in hardware, software or a combination of hardware and software.

FIG. 1 schematically illustrates a block diagram of an apparatus 100 according to an example of the present disclosure. The apparatus 100 comprises at least one processor 102; and at least one memory 103 including computer program code 105; the at least one memory 103 and the computer program code 105 configured to, with the at least one processor 102, cause the apparatus 100 at least to perform adapting a gaze dependent foveated rendering process in response to a determination of a sub-optimal operational condition of the gaze dependent foveated rendering process.

For the purposes of illustration and not limitation, in some examples the sub-optimal operational condition of the gaze dependent foveated rendering process may comprise a sub-optimal operational condition of the gaze tracker (e.g. a failure in the gaze tracker or an error, null measurement, loss of tracking, inaccurate or unreliable determination of a user's gaze positon). In some examples the adaptation of the gaze dependent foveated rendering process comprises controlling a parameter of the gaze dependent foveated rendering process, such as a position, shape, size and/or quality of a foveation region.

In some examples, upon detection of a sub-optimal operational condition (e.g. error in the gaze tracking) the position of the foveation region may be moved [e.g. so as to encompass/cover one or more particular positions in the image, such as a central position of the display as illustrated and discussed further below with respect to FIG. 9, or a position of interest in the displayed image as illustrated and discussed further below with respect to FIG. 10].

In some examples, upon detection of a sub-optimal operational condition, the size of the foveation region may be enlarged [e.g. so as to encompass/cover one or more particular positions in the image as illustrated and discussed further below with respect to FIGS. 11, 12 and 13.

In some examples, upon detection of a sub-optimal operational condition, additional foveation regions may be provided [e.g. so as to encompass/cover one or more particular positions in the image, such as both a last known gaze position and a position of a point of interest as illustrated and discussed further below with respect to FIG. 12].

The above such remedial actions may enable a user not to visually perceive anything being amiss following the occurrence of a sub-optimal condition nor notice the fact that there has been an error. Such actions may provide time for the system to recover from the sub-optimal condition/error (e.g. re-obtain a position/tracking/lock of the user's gaze position) and resume normal operation of the gaze dependent foveated rendering process.

Various examples may enable the gaze dependent foveated rendering process to be more resilient to sub-optimal operational conditions (e.g. not least gaze tracking errors) by adjusting the gaze dependent foveated rendering process so as to accommodate for the sub-optimal operational condition in a manner that is minimally noticeable by a user.

In FIG. 1, the apparatus 100 comprises a controller 101. Implementation of the controller 101 may be as controller circuitry. Implementation of the controller 101 can be in hardware alone (for example processing circuitry comprising one or more processors and memory circuitry comprising one or more memory elements), have certain aspects in software including firmware alone or can be a combination of hardware and software (including firmware).

In the illustrated example, the apparatus 100 comprises a controller 101 which is provided by a processor 102 and memory 103. Although a single processor and a single memory are illustrated in other implementations there may be one or more processors (having one cores) and/or there may be multiple memories some or all of which may be integrated/removable and/or may provide permanent/semi-permanent/dynamic/cached storage.

The memory 103 stores a computer program 104 comprising computer program code 105, such as computer program instructions, that control the operation of the apparatus 100 when loaded into the processor 102. The computer program instructions provide the logic and routines that enable the apparatus to perform the methods presently described.

The at least one memory 103 and the computer program code 105 are configured to, with the at least one processor 102, cause the apparatus 100 at least to perform the method described below and, for example with respect to FIGS. 2 and 3.

The processor 102 is configured to read from and write to the memory 103. The processor 102 may also comprise an input interface 106 via which data [not least such as a signal indicative of a sub-optimal operational condition of a gaze dependent foveated rendering process, e.g. a gaze tracker error received from a gaze tracker 108] and/or commands are input to the processor 102, and an output interface 107 via which data and/or commands [not least such as a command to adjust the gaze dependent foveated rendering process, e.g. a parameter of the same, for display on a display 109] are output by the processor 102. The apparatus 100 may be comprised in a system 110 that includes the gaze tracker 108 and the display 109. In some examples, the apparatus 100, the gaze tracker 108 and the display 109 may be integrated, e.g. housed, in a single device.

The computer program 104 may arrive at the apparatus 100 via any suitable delivery mechanism 111. The delivery mechanism 111 may be, for example, a non-transitory computer-readable storage medium, a computer program product, a memory device, a record medium such as a compact disc read-only memory, or digital versatile disc, or an article of manufacture that tangibly embodies the computer program 104. The delivery mechanism may be a signal configured to reliably transfer the computer program 104.

The apparatus 100 may receive, propagate or transmit the computer program 104 as a computer data signal.

The apparatus may be comprised in or embodied as: chipset, a module or a device. Such a device may be at least one of: a portable device, a handheld device, a wearable device, a wireless communications device, a user equipment device, a client device, a server device a mobile device, a hand held portable electronic device, a display device, a near eye display device, a virtual reality display device, and an augmented reality display device. However, in some examples, the apparatus may be embodied as a chip, chip set or module, i.e. for use in any of the foregoing devices. As used here 'module' refers to a unit or apparatus that excludes certain parts/components that would be added by an end manufacturer or a user.

Such devices may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

Figure 2:
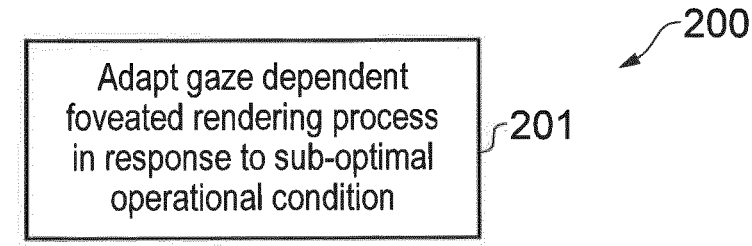
FIG. 2 schematically illustrates a method.

FIG. 2 schematically illustrates a method 200 of the present disclosure. In block 201, a gaze dependent foveated rendering process is adapted in response to a determination of a sub-optimal operational condition of the gaze dependent foveated rendering process.

Figure 3:
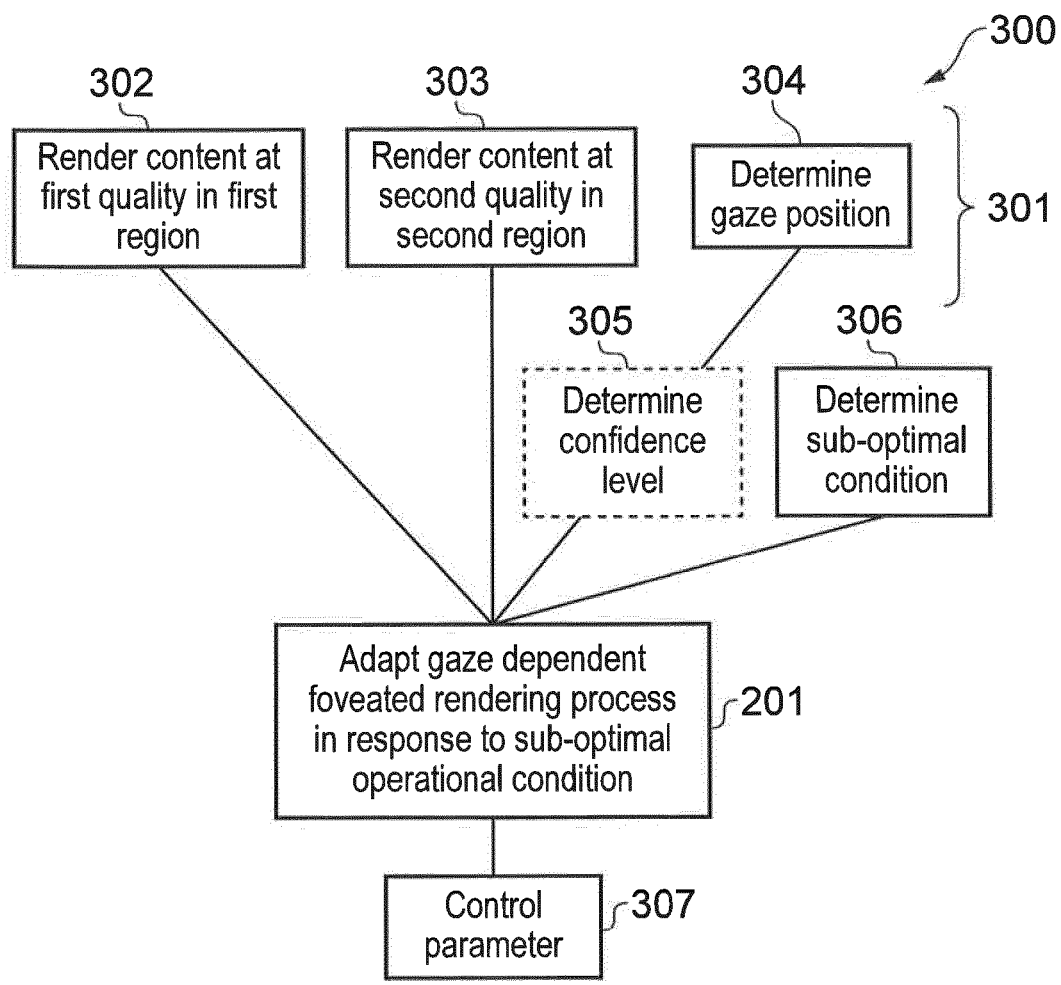
FIG. 3 schematically illustrates a further method.

FIG. 3 schematically illustrates a flow chart of a further method 300 of the present disclosure.

Method blocks 302-304 illustrate an example of a gaze dependent foveated rendering process 301. In some examples, the gaze dependent foveated rendering process 301 comprises:

Block 302—rendering first content (foveal content) 701a of an image 700 within at least a first region (foveation region) 701 of the image at a first quality;

Block 303—rending second content (peripheral content) 702a within at least a second region (peripheral region) 702 of the image 700 at a second quality; and Block 304—determining a position 703, 703', within the displayed image, of a user's gaze.

The image content inside the foveation region 701, foveal content 701a, is rendered/displayed at a different image quality to that of the image content, peripheral content 702a, rendered/displayed in the remaining peripheral region 702 outside of and surrounding the foveation region. The foveal content of the foveation region may be of a higher quality relative to the peripheral content of the peripheral region 702. The differing quality of the content in the foveation and peripheral regions may relate to, not least, one or more of: differing: resolution, bit rate, colour depth, compression level and depth of field.

In block 305, a confidence value or reliability score may be determined and associated with the determined gaze position 703, 703'. The confidence value may be related to a reliability of the determined gaze position measurement which is indicative of the accuracy/reliability of the determined gaze position, i.e. a likelihood/probability of that the determined gaze position is (or is not) an accurate measurement of the actual/true position of the user's gaze 704. The confidence value may be dependent upon and/or determined based on various factors not least:

externally detected conditions (e.g. bright ambient sunlight which could confuse the eye tracker/glint detection, or motion/acceleration of the eye tracker/display which could offset the alignment/calibration of the gaze position detection)

fast eye motion (e.g. eye movement at a rate that is too fast for eye tracker to track/precisely determine gaze position in real-time) user closing eyes/blinking detected eye gaze patterns differing from typical gaze patterns (for the user, for the displayed content)

binocular differences (i.e. differing determined relative gaze positions for each eye, e.g. a disparity between a left eye's determined gaze position 704 relative to a right eye's determined gaze position 703")

In block 306, a sub-optimal operational condition of the gaze dependent foveated rendering process may be determined.

In some examples, the sub-optimal operational condition of the gaze dependent foveated rendering process may comprise a sub-optimal operational condition of a gaze tracker used to determine the gaze position. In some examples, the determination of a sub-optimal operational condition may be via the receipt of a signal indicative of a sub-optimal condition or error (e.g. in signal related to one of the various factors above, or even a signal indicative of a determined confidence value crossing a threshold). In some examples, determining an error or failure in the eye gaze may be automatically determined in real time by determining a lack of receipt of a determined gaze position signal from the eye tracker for a predetermined time period, or detecting a null/undefined measurement/determined gaze position value. In some examples, a sub-optimal operational condition may be detected by determining a first gaze position of a first eye of the user, and determining a second gaze position of a second eye of the user and then determining a contradiction/disparity in the first and second gaze positions, i.e. a difference between the first and second gaze positions exceeding a threshold.

In some examples, a sub-optimal operational condition may be automatically determined in real time, for example by detecting a contradiction/disparity between a determined gaze position and a position of a point/object of interest in the rendered content. The position of the point/object of interest may be determined from metadata of the content or image analysis of content (i.e. to detect areas of moving parts of dynamic image content/video, a face, or a high contrast area,]. Where there is a difference between the determined gaze position and the position of the point/object of interest that exceeds a threshold, this could be indicative of a sub-optimal operational condition/gaze tracking error.

In some examples, a user input may be received which is indicative of a sub-optimal operation or error in the eye gaze tracker [e.g. a user indication that a visualized gaze point of first foveation region appears to be off or shaky, or that a gaze based UI is not responding naturally]. In some examples, the determination of a sub-optimal operational condition may involve determining a rate at which gaze positions are determined and determining the rate crossing a threshold value.

In some examples, the determination of a sub-optimal operational condition may involve:
  determining a difference between a determined gaze position and a position of a point/object of interest in the content [In real world usage, it is probable that a user's gaze would fall upon an object of interest of the displayed content. Accordingly, where it is determined that the determined gaze position and the position of a point/object of interest in the content are not aligned/the same, then such an unusual or unexpected determined gaze position may be indicative of a misalignment or calibration error] determining one or more areas of the content that risks giving rise to user perceivable artefacts following foveated rendering, particularly at the interface of regions, where high quality foveal content rendered abuts against differently rendered quality content of an adjacent region. For example, high contrast areas with repeating patterns are likely to cause perceivable artefacts when their rendering fluctuates between high and low quality as a foveation region traverses across such high contrast areas. Such a determination can be effected by applying an image/pattern recognition algorithm to the content to identify particular patterns in the image that may give rise to noticeable/perceivable artefacts following foveated rendering. Also, image/content metadata could be used to determine such problem areas of image content that risk giving rise to perceivable artefacts following foveated rendering. In this regard the metadata may include an identification of areas that could cause perceivable artefacts following foveated rendering.
  determining computing resources being below a threshold level. For example determining available: network bandwidth, processing power, battery level being below a threshold level; each of which may negatively affect the gaze dependent foveated rendering process and lead to a sub-optimal operational condition (i.e. not being able to stream and render enough high quality foveal content for the first/foveation region (which may trigger the need to decrease size of the foveation region or quality level on the rendering therein). In some examples, the quality of the foveal content may be reduced.

In block 201, a gaze dependent foveated rendering process is adapted in response to a determination of a sub-optimal operational condition of the gaze dependent foveated rendering process, i.e. similar to FIG. 1.

In Block 307, the adaption of the gaze dependent foveated rendering process comprises controlling a parameter of the gaze dependent foveated rendering process.

The gaze dependent foveated rendering parameter may relate to one or more of: a position, shape, size and quality of one or more of the at least first/foveal region and the at least second/peripheral regions.

The gaze dependent foveated rendering parameter may relate to the quality level of the rendering of content within the at least first/foveal region and the at least second/peripheral regions. In some examples, peripheral content quality may be increased, for example colour information may be restored to the peripheral content if otherwise displayed in grayscale or with reduced colour information.

In some examples, the amount by which the parameter changes may be dependent on the likelihood of suboptimal operation/failure of the gaze tracker.

For example, the degree to which a size of the foveal region changes may be dependent on to the confidence value associated with the determined gaze positon. For instance, the extent of change of the parameter value may be proportional/inversely proportional to the confidence value, i.e. small confidence value (large uncertainty in gaze position) causing a large change in parameter value.

Figure 9:
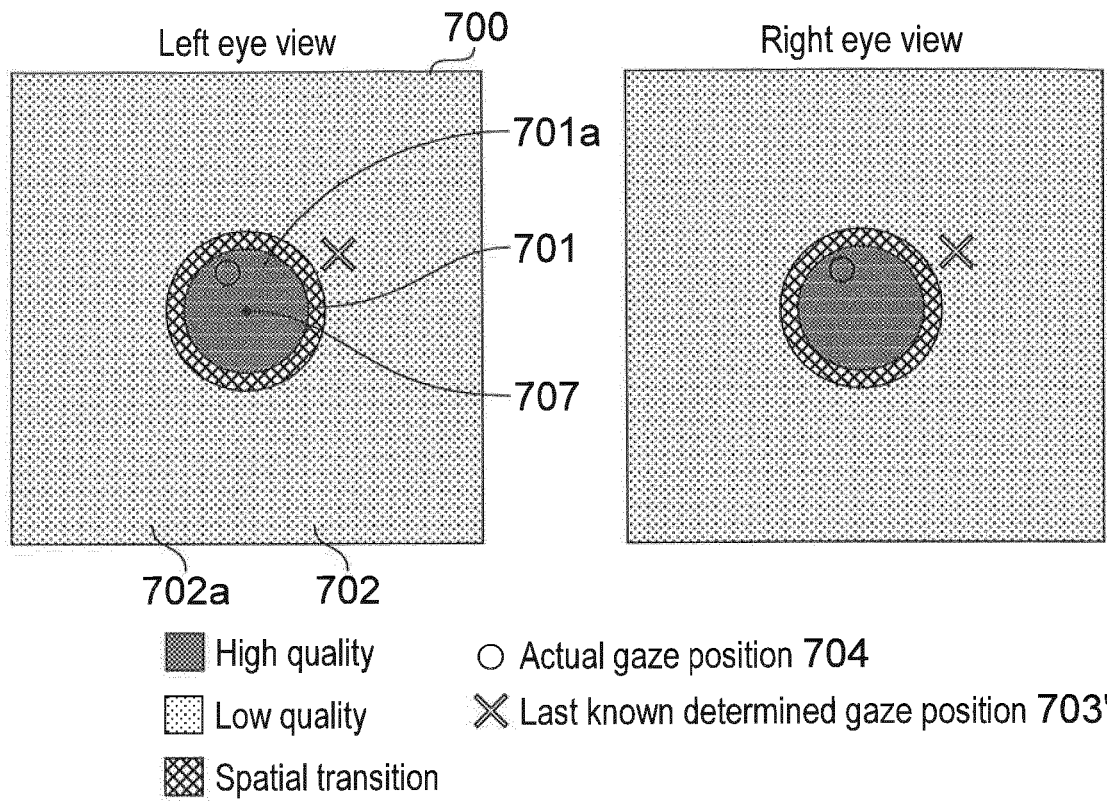
FIGS. 9 to 16 schematically illustrate examples of actions performed following a sub-optimal operational condition in a gaze dependent foveated rendering process.
Figure 10:
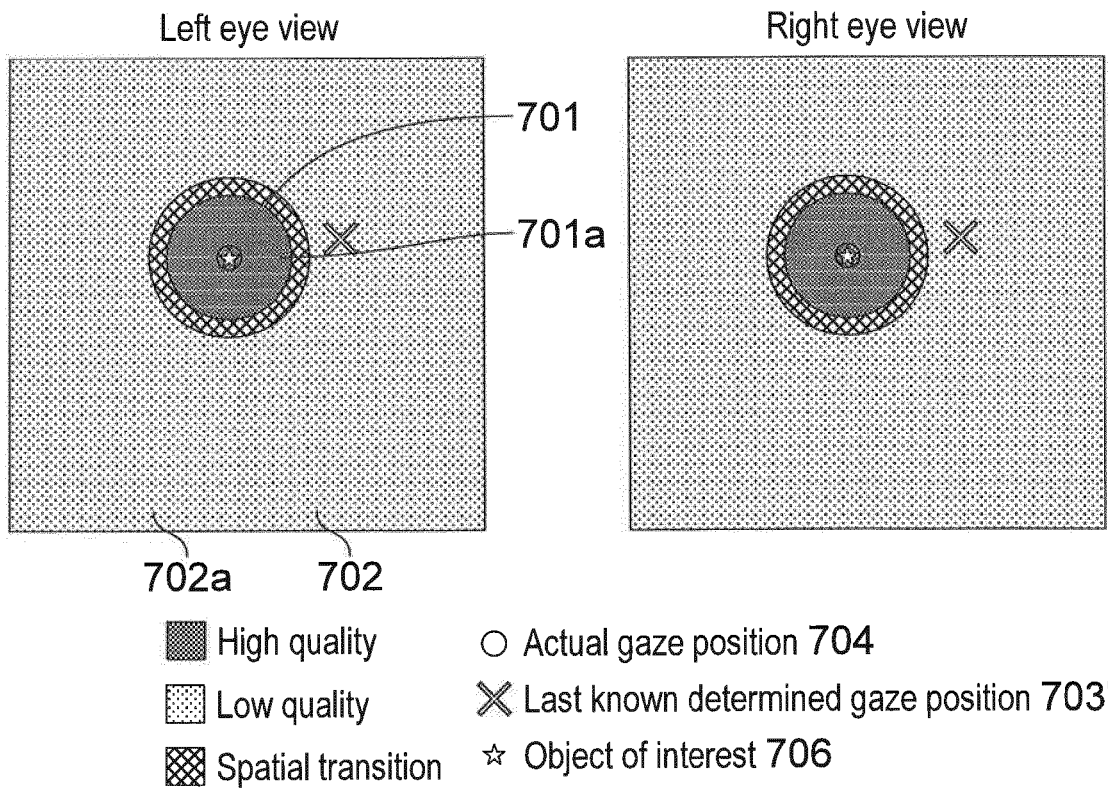

In response to a determination of a sub-optimal operational condition, a position of the first/foveal region may be controlled, as illustrated in FIGS. 8-10.

FIG. 8, schematically illustrates an example of a recovery action responsive to a determination of a sub-optimal operational condition, namely maintaining a position of the first/foveal region at determined gaze position/last known determined gaze position, i.e. a last reliable gaze position having a sufficient confidence level or the last received gaze position prior to a failure resulting in no further gaze positions being determined. This may ameliorate/compensate the situation as the user's current actual gaze may likely remain in the current position of the foveation region [not shown in FIG. 8].

In response to a determination of a sub-optimal operational condition, a position of the first/foveal region may be adjusted/moved so as to correspond to a particular position within the displayed image.

FIG. 9, schematically illustrates an example of a recovery action responsive to a determination of a sub-optimal operational condition, namely moving the position of the foveation region 701 to a centre of the display 707. This may ameliorate/compensate for the situation since, on average a user typically gazes directly forward, i.e. to a centre of the display.

FIG. 10, schematically illustrates an example of a recovery action responsive to a determination of a sub-optimal operational condition, namely moving the position of the foveation region 701 to a position of a point or object of interest 706 of the image 700. In some examples, where there are more than one points of interest, the position of the first region may be moved to correspond to a position of a point/object of interest that is closest to the last (reliably) known position of the determined gaze position 704. This may ameliorate/compensate for the situation since a user's gaze may likely have moved and settled to a point/object of interest of the displayed content (such as a face, an area with motion or high contrast area, the positional information on which may be automatically detected [via applying an image/pattern recognition algorithm] or read from content metadata).

In response to a determination of a sub-optimal operational condition, a size of the at least first/foveal region may be controlled.

Figure 11:
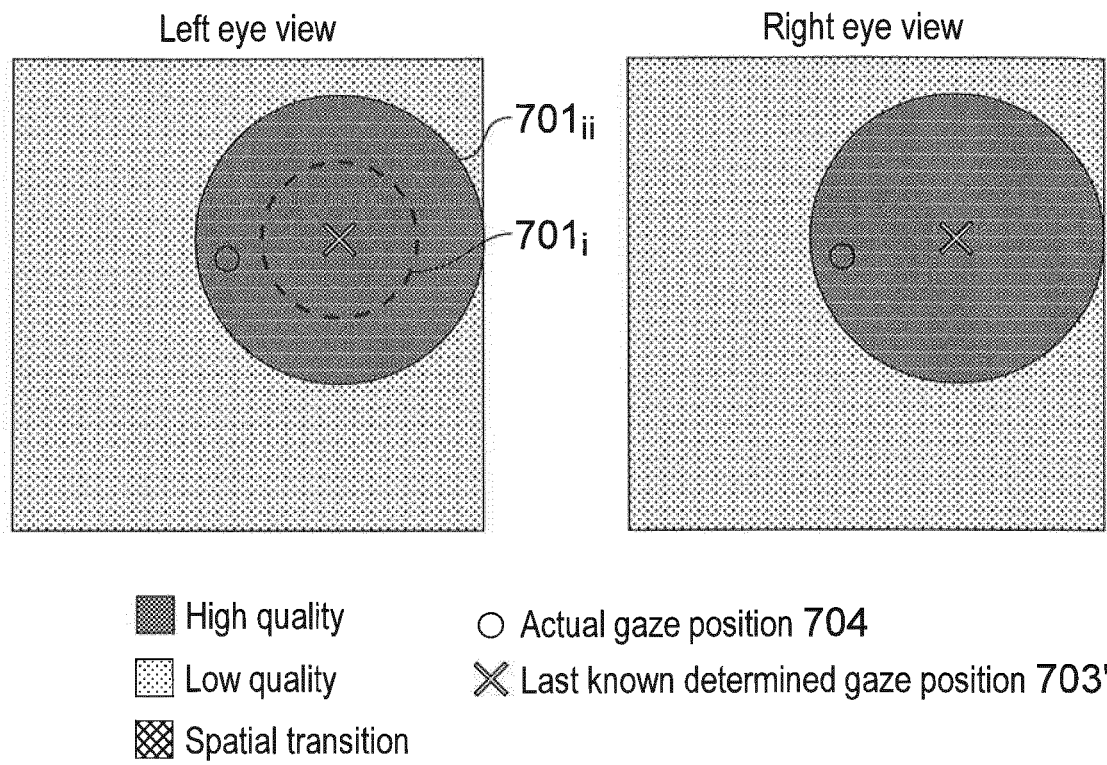

FIG. 11, schematically illustrates an example of a recovery action responsive to a determination of a sub-optimal operational condition, namely adjusting the size of the foveation region. The size of first region 701i may be changed (e.g. enlarged 70*l* ii), optionally whilst maintaining its position, e.g. at a last known gaze position.

This may ameliorate/compensate for the situation wherein the user's current actual gaze is uncertain. The size of the foveation region may be adjusted to as to encompass/cover one or more particular positions, e.g. one or more of: a last known determined position, a position of a point of interest in the displayed content and a centre of the display. The amount of enlargement/extension of the foveation region may be proportional to the likelihood of the gaze tracker failure, e.g. proportional to a confidence values associated with a determined gaze position.

In some examples where a transitional region is provided, this region is replaced with the foveation region, i.e. the content in the transitional region is rendered at the first (e.g. high quality). In other words, the enlargement of the foveation region may comprise rendering content in the transition region (whose content was rendered in a cross blending manner between high and low quality) at high quality. In some examples, the enlargement of the foveation region may comprise rendering content in the peripheral region (whose content was rendered at a second/low quality) at high quality, i.e. resulting in a rendering of content similar to that shown in FIG. 13.

In response to a determination of a sub-optimal operational condition, regions may be added or removed. For examples, additional foveation regions may be provided, i.e. additional first regions having content rendered therein at a first (e.g. high) quality. The position of such additional foveation regions may be adjusted to correspond to and/or encompass particular positions in the displayed content, e.g. last known gaze position, centre of display, and positions/objects of interest. In addition, or alternatively, regions may be removed, for example a transition region or peripheral region may be removed and the content rendered therein may be rendered at high quality, i.e. in effect changing the transition region or peripheral region to foveation region whose content therein is rendered at a high quality.

Figure 12:
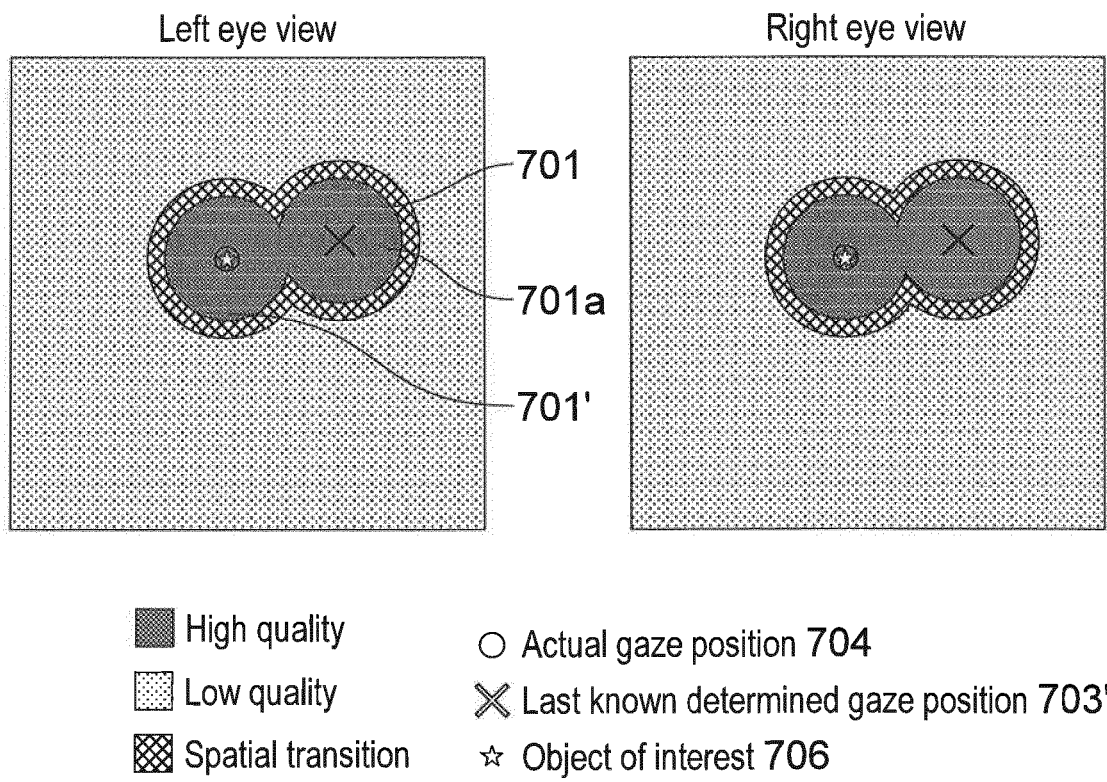

FIG. 12, schematically illustrates an example of a recovery action responsive to a determination of a sub-optimal operational condition, namely generating an additional foveation region 701'. One of the first/foveation regions may maintain its position, e.g. foveation region 701 remaining at a last known gaze position, whilst the other first/foveation region 701' may be positioned to encompass a position of a point/object of interest 706 (such as an area of motion in the rendered content). This may ameliorate/compensate for the situation wherein the user's current actual gaze is uncertain by adding further foveation regions so as to encompass/cover one or more particular positions, e.g. one or more of: a last known determined position, a position of a point of interest in the displayed content and a centre of the display.

Other particular positions/areas/objects that may be rendered in high quality during failures, i.e. areas to be encompassed within a foveation region include:
 User selected area, e.g. areas pointed/selected at using a mouse or other pointer device
 areas of a display device, such as for a see-through augmented reality glasses, having a uniform or low brightness background surface, where the effect of high/low quality rendering level would be more perceivable/noticeable as compared to if the background surface were a noisy or bright background.
 visual information that is recently newly presented, e.g. graphical user interface elements that are added/overplayed the content.

Content specific metadata can be used to assist in the failure recovery, e.g. by foveating all objects of interest stored in the metadata (i.e. providing a foveation region around each object of interest). Such content metadata may be acquired with different methods and stored locally, in cloud, and/or streamed along with the content. The metadata may include positions of the most interesting objects or relevant areas in the content. Positions of the most interesting objects or relevant areas in the content may be generated by manually labelling (personal or community produced), or it may be automatically detected, identified by the user, or based on other users' gaze tracking data. The metadata may include information indicative of what areas/regions to foveate and when (i.e. to be encompassed by one or more foveation regions) should there be a sub-optimal operational condition/failure, as well as when to turn off foveation. Data may also be collected from user viewing habits of other content, e.g. which has/shares some similar aspects. By way of example, it may be determined that a user who watches cat videos likes cats, hence any cats in content may be identified as an object of interest.

Other parameters of gaze dependent foveated rendering that may be adjusted in response to a determination of a sub-optimal operational condition include controlling a rate of change of: position, shape, size and/or quality of one or more of the regions. The rate of change of such parameters may be dependent on the confidence value of the determined gaze position. For example, a position of the first region may be gradually altered over a period of time to correspond to move to a particular position. A position of the foveation region may gradually (over time) be shifted from a last known gaze position to the display centre or to a closest object of interest.

The rate of parameter change, e.g. speed of the motion/transition between peripheral and foveal content rendering as the regions move, may be kept at a maximum, to instantly reflect a new determined gaze position, e.g. after a saccadic eye motion. This may be so where the eye tracker is fast enough (i.e. the eye tracker is sufficiently responsive to track a user's eye movement such as saccades). However, even after a perfectly tracked saccade, foveated rendering for a new determined gaze position takes time. The transitioning of a low resolution part of the image (from a former peripheral region) into a high resolution image for rendering in a new/current foveation region might be perceivable by the user as a sudden change in the content, whereas a more gradual change may be less noticeable.

If the response time of the system (e.g. the system as discussed below with respect to FIG. 4) is temporarily or permanently low, and the user is likely able to perceive the change in content, a smoother/slower rate of transition may be used, e.g. gradually during multiple displayed frames changing between the quality levels. Such smoothing can take place during the transitions between the low and high quality content rendering, in both transition directions (i.e. a part of the image formerly in a peripheral region now in a foveation region following a change in the position/size of the foveation region, and likewise a part of the image formerly in a foveation region now in a peripheral region following a change in the position/size of the foveation region), and especially during failure recovery situations Other parameters of gaze dependent foveated rendering that may be adjusted in response to a determination of a sub-optimal operational condition include the provision or removal of one or more of the regions.

Figure 13:
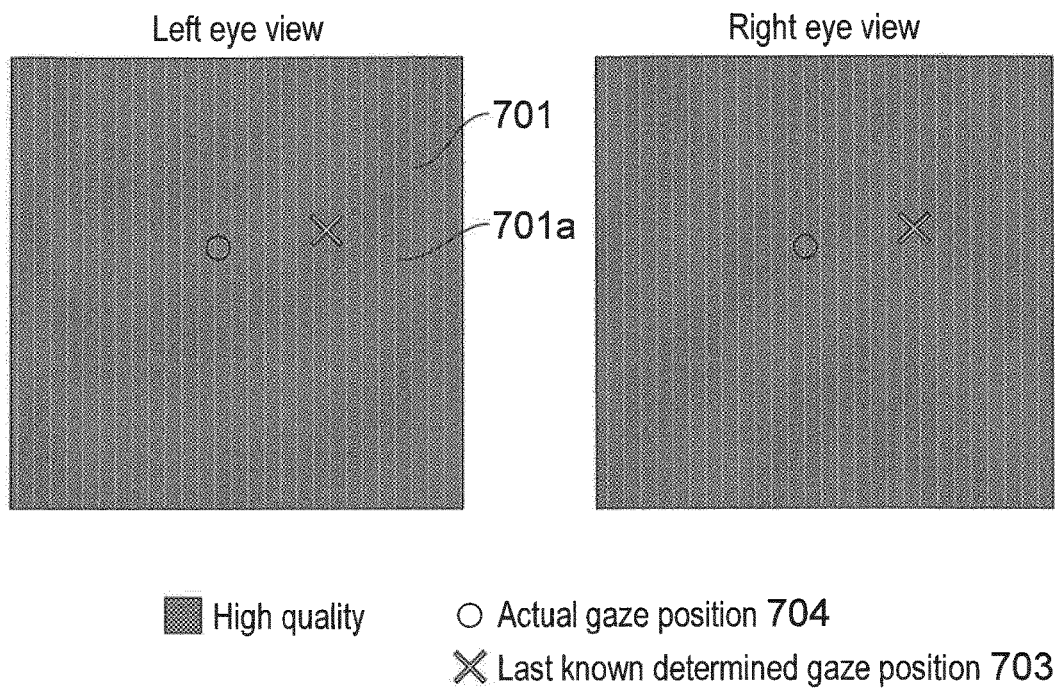

FIG. 13 schematically illustrates an example of a recovery action responsive to a determination of a sub-optimal operational condition, namely ceasing/stopping foveated rendering and performing "normal" rendering instead wherein the entirety of the image is rendered in high quality or an intermediate quality level. This can be effected either by removing the peripheral region such that the entirety of the image is displayed in high quality, or by changing the size, shape and/or quality of the first/foveal region to as to encompass/cover the entire area of the display, such that there is no surrounding peripheral region on the display area again such that the entirety of the image is displayed in high quality.

Another parameter of gaze dependent foveated rendering that may be adjusted in response to a determination of a sub-optimal operational condition includes adjusting a rendering mode the content. This could equate to stop foveated rendering and performing normal rending as discussed above with respect to FIG. 13. Another change in rendering mode may one or more of:
  switching between symmetric and asymmetric binocular gaze dependent foveated rendering,
  switching between gaze dependent foveated rendering and non-gaze dependent foveated rendering (e.g. wherein the one or more foveation regions are non-gaze dependent),
  performing gaze dependent foveated rendering only for one eye and conventional/non-gaze dependent foveated rendering for the other eye.

FIGS. 7-12 illustrate symmetric binocular gaze dependent foveated rendering, namely wherein the same adjustment that is performed for the gaze dependent foveated rendering process for a user's first eye is also performed for the gaze dependent foveated rendering process for the user's second eye. For example, where a parameter is changed by an amount for the left eye's gaze dependent foveated rendering process, the equivalent parameter is changed any an equivalent amount for the right eye's gaze dependent foveated rendering process, i.e. any changes to the left eye's gaze dependent foveated rendering process are mirrored for the right eye's gaze dependent foveated rendering process such that symmetric changes occur.

Figure 14:
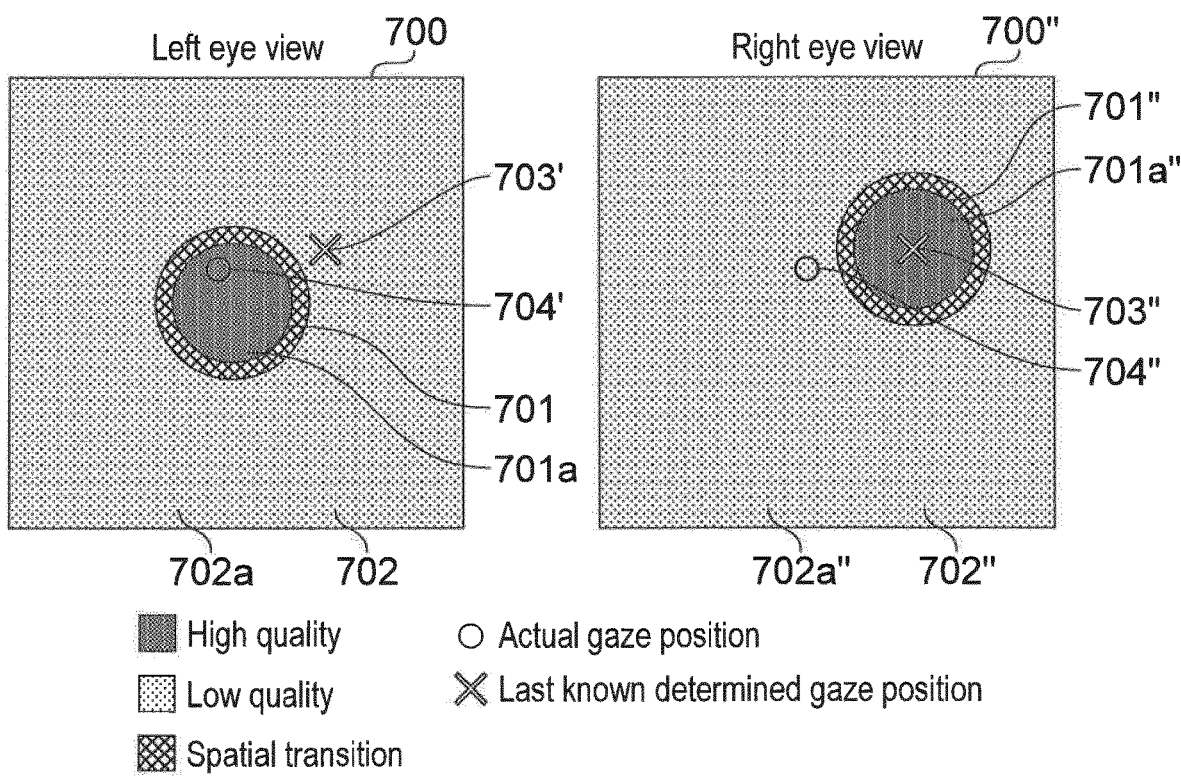

A binocular gaze dependent foveated rendering process, may comprise [with respect to FIG. 14]:
  performing a first gaze dependent foveated rendering process of first content/image 700 or a first eye of a user;
    determining a first position 703', within content rendered on a first display for the user's first eye, of a gaze of the user's first eye
    rendering content 701a in a first region 701 of the first display at a first quality;
    rendering content 702a in a second region 702 of the first display at a second quality;
    the first gaze dependent foveated rendering process having a first gaze dependent foveated rendering parameter; and
  performing a second gaze dependent foveated rendering of second content 700" for a second eye of the user
    determining a second position 703", within content rendered on a second
    display for the user's second eye, of a gaze of the user's second eye;
    rendering content 701a" in a third region 701" of the second display at a third quality;
    rending content 702" in a fourth region 702" of the second display at a fourth quality;
    the second gaze dependent foveated rendering process having a second gaze dependent foveated rendering parameter; and
  wherein the second gaze dependent foveated rendering parameter is equivalent to the first gaze dependent foveated rendering parameter.

In a symmetric binocular gaze dependent foveated rendering process, the first and second equivalent parameters (e.g. position/size/shape/quality) are controlled/adjusted in a similar manner/to the same extent. For example, the same control of position/size/shape/quality is performed for each of left and right eye's foveation regions, so that any adjustment to the position/shape/size/quality of one eye's foveation region is mirrored so that same adjustment is performed for position/shape/size/quality of the other eye's foveation region, see FIGS. 8-13.

In an asymmetric binocular gaze dependent foveated rendering process, the first and second equivalent parameters (e.g. position/size/shape/quality) are controlled/adjusted independently in a different manner/to differing extents. For example, differing control of position/size/shape/quality performed for each of left and right eye's foveation regions such that an adjustment to position/shape/size/quality of one eye's foveation region is not mirrored by an equivalent/similar adjustment for position/shape/size/quality of the other eye's foveation region, see FIGS. 14-16.

In some examples, a position of one of the first and third regions is maintained whilst the position of the other of the first and third regions is changed in response to a determined sub-optimal operational condition.

FIG. 14 schematically illustrates an example of an asymmetric recovery action responsive to a determination of a sub-optimal operational condition, namely moving the position of one eye's foveation region to the centre of the eye' display, whilst maintaining the other eye's foveation region a last known determined position for the other eye.

In some examples, a size of one of the first and third regions is maintained whilst the size of the other of the first and third regions is changed in response to a determined sub-optimal operational condition.

Figure 15:
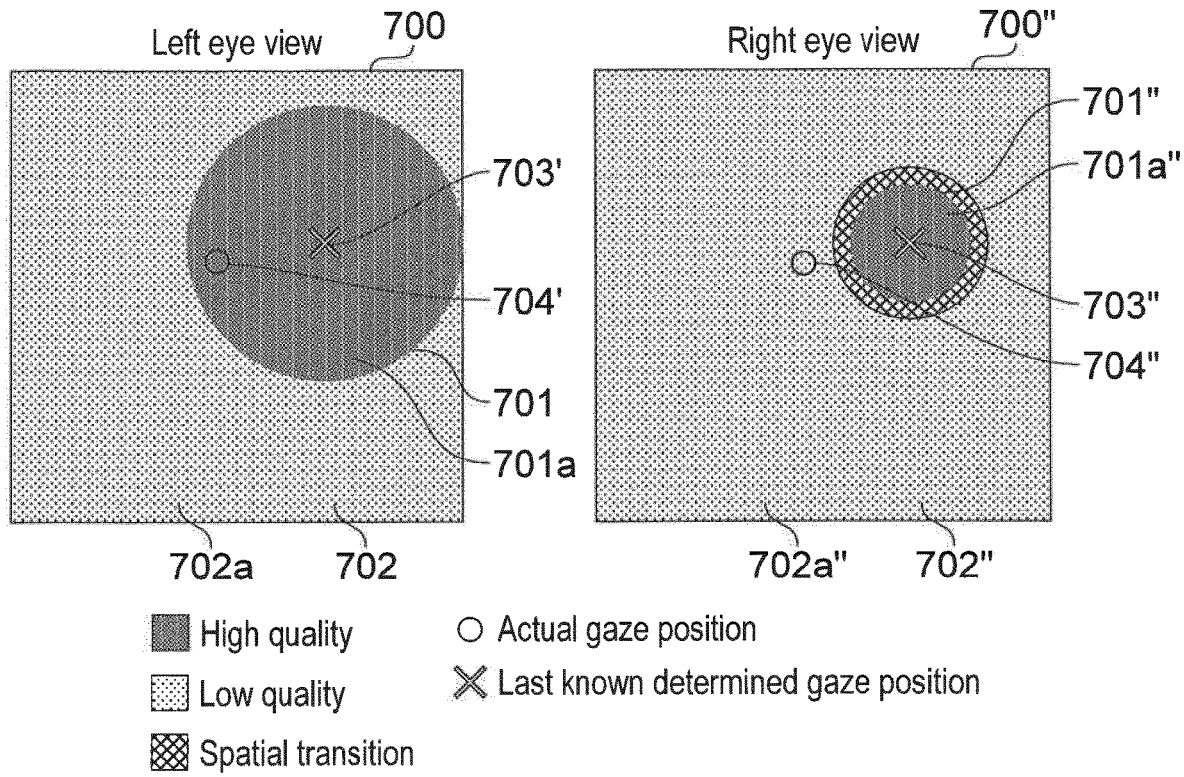

FIG. 15 schematically illustrates an example of an asymmetric recovery action responsive to a determination of a sub-optimal operational condition, namely adjusting the size of the foveation region for one eye whilst maintaining the size of the foveation region for the other eye.

In some examples, differing focal depth ranges may be rendered for each of a user's left and right eyes. For example, a limited focal depth range may be maintained for one eye, while extending the coverage for the other.

In some examples, content in one of the first and second displays is rendered at a respective first and third quality (e.g. the entirety of on display is rendered in high quality) whilst content in the other of the first and second displays is rendered at a respective second and fourth quality (e.g. the entirety of the other display is rendered in low quality).

Figure 16:
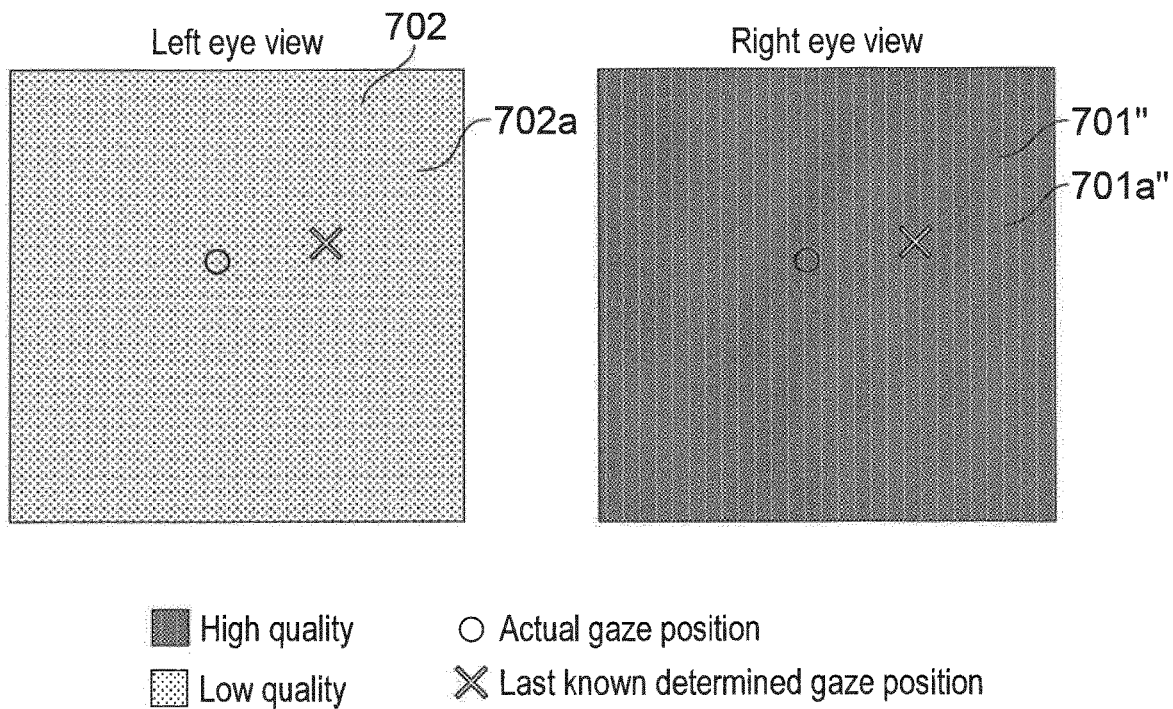

FIG. 16 schematically illustrates an example of an asymmetric recovery action responsive to a determination of a sub-optimal operational condition, namely ceasing/stopping foveated rendering for one eye and rendering the entirety of the eye's image in high quality and rendering the entirety of the other eye's image in low quality. It has been found that viewing of images with asymmetric resolution, reducing the resolution or quality of the image for one eye does not cause a significant reduction in the observed overall image quality.

Whilst a generally circular shaped foveation region has variously been illustrated, it is to be appreciated that the shape of the foveation region, and consequently the corresponding shape of the peripheral region, may likewise be of any shape.

Other actions that may be triggered/caused to be performed responsive to a determination of sub-optimal operational conditions/failures include:

For content that change over time (e.g. video, game, etc.) the progress of the content playback can be altered, e.g. slowed down or stopped, i.e. so as to lower the complexity of the rendered content during a failure.

automatic ignition of gaze tracker calibration or a recalibration process.

generating a stimulus that likely catches users' attention (e.g. a visual stimulus such as a slowly flying butterfly). This could also be used for conducting a "hidden" re-calibration process.

new visual or audible elements could be added to the content the content/image being turned off, or only shown in the last know gaze position.

Certain, but not necessarily all, examples of the present disclosure seek to address the situation where the gaze dependent foveated rendering process is operating sub-optimally (e.g. there is an error, failure or unreliable gaze detection measurement/tracking from gaze tracker, i.e. such that the determined gaze position does not reliably correspond to user's actual gaze position). Certain, but not necessarily all, examples of the present disclosure seek to take remedial actions to ameliorate/compensate/recover or remedy the situation (for example until such time as normal operation is resumed) in an optimal manner that is minimally invasive/perceptible to the user and not unduly onerous in computing resources]

The flowchart of FIG. 3 represents one possible scenario among others. The order of the blocks shown is not absolutely required, so in principle, the various blocks can be performed out of order. Not all the blocks are essential. In certain examples one or more blocks may be performed in a different order or overlapping in time, in series or in parallel. One or more blocks may be omitted or added or changed in some combination of ways.

Examples of the present disclosure are described using schematic block diagrams and flowchart illustrations. It will be understood that each block (of the flowchart illustrations and block diagrams), and combinations of blocks, can be implemented by computer program instructions of a computer program. These program instructions may be provided to one or more processor(s), processing circuitry or controller(s) such that the instructions which execute on the same create means for causing implementing the functions specified in the block or blocks, i.e. such that the method may be computer implemented. The computer program instructions may be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Figure 4:
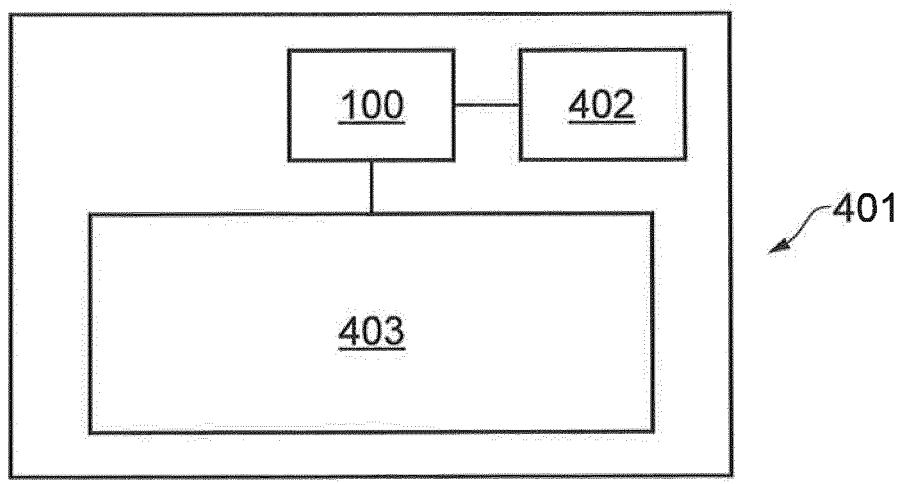
FIG. 4 schematically illustrates a system.

The above described methods may be performed by the apparatus of FIG. 1 or the system of FIG. 4.

FIG. 4 schematically illustrates a system 401. The system includes one or more components for effecting the above described methods and functionality. The illustrated system comprises:

the apparatus 100 (of FIG. 1);

at least one eye tracker 402 configured to determine a user's gaze position (i.e. the gaze position of one or both of a user's eyes); and at least one display 403 for rendering gaze dependent foveated rendered content.

The display 403 which the gaze dependent foveated rendering may be rendered on/displayed on may be any suitable type of display, not least for example one or more of: a conventional direct view display, a projection based display, a Near Eye Display (NED), a Head Mountable Display (HMD), a 3D display, a Virtual Reality (VR) display, an Augmented Reality (AR) display, a Mixed Reality (MR) display, a heads-up display (HUD) and a see-though display. In some examples, the eye gaze tracker/detector is integrated with the display.

The image/content which is the subject of foveated rendering may be any type of suitable content, not least for example: an image, visual content (dynamic or static), audio/visual content, video and 3D content.

For 2D visual content, the gaze position may relate to 2D co-ordinates of a user's gaze position within the displayed 2D image or within the image plane. Where the content is 3D visual content, the gaze position may correspond to 3D coordinates within a displayed virtual 3D image. In some examples, where the visual content is 3D visual content, the parameter to be adjusted may correspond to a rendered depth of field.

In some examples, a gaze property is measured, such as a visual angle with reference to the display device (which may be related to visual angles of the displayed information).

In some examples, where the content is audio/visual content, the audio output may also be adjusted. For example, elevating some audio features/objects or adding new audio contents, or using spatial audio cues to direct user's attention during sub-optimal operational condition/failures. In some examples, where the audio relates to spatial audio, spatial audio content from a foveation region may be output/rendered at a differing (e.g. higher) quality than spatial audio content from the peripheral region, e.g. differing bit rate, compression levels, volume. Alternatively spatial audio from the peripheral region may not be output/rendered at all.

The component blocks of FIG. 4 are functional and the functions described may or may not be performed by a single physical entity. For example, for binocular use, the display may comprise separate first and second displays for each of the user's left and right eyes.

Although examples of the apparatus have been described above in terms of comprising various components, it should be understood that the components may be embodied as or otherwise controlled by a corresponding controller or circuitry such as one or more processing elements or processors of the apparatus. In this regard, each of the components described above may be one or more of any device, means or circuitry embodied in hardware, software or a combination of hardware and software that is configured to perform the corresponding functions of the respective components as described above.

References to 'computer-readable storage medium', 'computer program product', 'tangibly embodied computer program' etc. or a 'controller', 'computer', 'processor' etc. should be understood to encompass not only computers having different architectures such as single/multi-core processors, single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Examples of the present disclosure provide both a method and corresponding apparatus comprising various modules, means or circuitry that provide the functionality for performing/applying the actions of the method. The modules, means or circuitry may be implemented as hardware, or may be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

It will be understood that each block and combinations of blocks, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory storage device and performed by a processor.

As will be appreciated, any such computer program instructions may be loaded onto a computer or other programmable apparatus (i.e., hardware) to produce a machine, such that the instructions when performed on the programmable apparatus create means for implementing the functions specified in the blocks. These computer program instructions may also be stored in a computer-readable medium that can direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational actions to be performed on the programmable apparatus to produce a computer-implemented process such that the instructions which are performed on the programmable apparatus provide actions for implementing the functions specified in the blocks.

Although specific terms are employed herein, they are used in a generic and descriptive sense only and not for purposes of limitation. Where a structural feature has been described, it may be replaced by means for performing one or more of the functions of the structural feature whether that function or those functions are explicitly or implicitly described.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not. Accordingly, features described in relation to one example/aspect of the disclosure may include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

As used herein, the "determining" (and grammatical variants thereof) can include, not least: calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise.

In the above description, the apparatus described may alternatively or in addition comprise an apparatus which in some other embodiments comprises a distributed system of apparatus, for example, a client/server apparatus system. In examples of embodiments where an apparatus provided forms (or a method is implemented as) a distributed system, each apparatus forming a component and/or part of the system provides (or implements) one or more features which collectively implement an example of the present disclosure. In some examples of embodiments, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims may be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims may depend from any other claims and that to the extent that any alternative embodiments may result from combining, integrating, and/or omitting features of the various claims and/or changing dependencies of claims, any such alternative embodiments and their equivalents are also within the scope of the disclosure.

We claim:

1. An apparatus comprising:
   at least one processor; and
   at least one non-transitory memory including computer program code;
   the at least one memory and the computer program code configured to, with the at least one processor, cause the apparatus at least to:
   determine a sub-optimal operational condition of the gaze dependent foveated rendering process;
   adapt a gaze dependent foveated rendering process in response to the determination of the sub-optimal operational condition of the gaze dependent foveated rendering process;
   wherein adapting the gaze dependent foveated rendering process comprises adjusting a position of at least one region of a display where content is rendered at a higher quality relative to content rendered in at least one other region of the display at a lower quality;
   wherein adapting the gaze dependent foveated rendering process comprises controlling at least one parameter of the gaze dependent foveated rendering process;
   wherein controlling the at least one parameter comprises controlling an adjustment rate of the position of the at least one region of the display where content is rendered at the higher quality is adjusted so that the adjustment is less perceivable to a user of the apparatus.

2. The apparatus of claim 1, wherein determining the sub-optimal operational condition of the gaze dependent foveated rendering process comprises:
   determining one or more areas of the content that risks giving rise to user perceivable artefacts following foveated rendering; and
   determining computing resources being below a threshold level.

3. The apparatus of claim 1, wherein the gaze dependent foveated rendering process comprises:
   rendering content in at least a first region of the display at a first quality, and rendering content in at least a second region of the display at a second quality; and
   wherein the at least one parameter of the gaze dependent foveated rendering process relates to one or more of:
   a position, shape, size or quality of one or more of the regions; or
   a rate of change of: position, shape, size or quality of one or more of the regions.

4. The apparatus of claim 1, wherein controlling the at least one parameter of the gaze dependent foveated rendering process is dependent upon at least one of:
   a determined gaze position;
   a last known determined gaze position;
   a position of an object of interest in the content; or
   a position of a center of the display on which the content is rendered.

5. The apparatus of claim 1, wherein the adjusting comprises moving the position of the at least one region of the display where content is rendered at a higher quality to at least one of:
   a center of the display;
   a last reliable gaze position having a sufficient confidence level; or
   a last received gaze position prior to a failure of the gaze dependent foveated rendering process resulting in no further gaze positions being determined.

6. The apparatus of claim 1, wherein the at least one parameter of the gaze dependent foveated rendering process relates to one or more of:
   provision of one or more additional regions; or
   removal or replacement of one or more of the regions.

7. The apparatus of claim 1, wherein determining the sub-optimal operational condition of the gaze dependent foveated rendering process comprises determining a sub-optimal operational condition of a gaze tracker.

8. The apparatus of claim 7, wherein determining the sub-optimal operational condition of the gaze tracker comprises determining a confidence value associated with a determined gaze position being below a threshold value.

9. The apparatus of claim 1, wherein determining the sub-optimal operational condition of the gaze dependent foveated rendering process comprises:
- determining a difference between a determined gaze position and a position of an object of interest in the content.

10. The apparatus of claim 1, wherein the at least one parameter of the gaze dependent foveated rendering process relates to a rendering mode, wherein the rendering mode comprises at least one of:
- gaze dependent foveated rendering,
- non-gaze dependent foveated rendering,
- non-foveated rendering,
- binocular rendering,
- symmetric binocular rendering, or
- asymmetric binocular rendering.

11. A method comprising:
- determining a sub-optimal operational condition of a gaze dependent foveated rendering process;
- adapting the gaze dependent foveated rendering process in response to the determining of the sub-optimal operational condition of the gaze dependent foveated rendering process;
- wherein adapting the gaze dependent foveated rendering process comprises adjusting a position of at least one region of a display where content is rendered at a higher quality relative to content rendered at least one other region of the display at a lower quality;
- wherein adapting the gaze dependent foveated rendering process comprises controlling at least one parameter of the gaze dependent foveated rendering process;
- wherein controlling the at least one parameter comprises controlling an adjustment rate of the position of the at least one region of the display where content is rendered at the higher quality is adjusted so that the adjustment is less perceivable to a user of a device.

12. The method of claim 11, wherein determining the sub-optimal operational condition of the gaze dependent foveated rendering process comprises:
- determining one or more areas of the content that risks giving rise to user perceivable artefacts following foveated rendering; and
- determining computing resources being below a threshold level.

13. The method of claim 11, wherein the gaze dependent foveated rendering process comprises:
- rendering content in at least a first region of a display at a first quality, and rendering content in at least a second region of the display at a second quality; and
- wherein the at least one parameter of the gaze dependent foveated rendering process relates to one or more of:
- a position, shape, size or quality of one or more of the regions; or
- a rate of change of: position, shape, size or quality of one or more of the regions.

14. The method of claim 11, wherein at least one parameter of the controlling the gaze dependent foveated rendering process is dependent upon:
- a determined gaze position, and
- a last known determined gaze position.

15. The method of claim 11, wherein controlling the at least one parameter of the gaze dependent foveated rendering process is dependent upon:
- a position of an object of interest in the content, and
- a position of a center of the display on which the content is rendered.

16. The method of claim 11, wherein the at least one parameter of the gaze dependent foveated rendering process relates to one or more of:
- provision of one or more additional regions; or
- removal or replacement of one or more of the regions.

17. The method of claim 11, wherein determining the sub-optimal operational condition of the gaze dependent foveated rendering process comprises determining a sub-optimal operational condition of a gaze tracker, wherein determining the sub-optimal operational condition of the gaze tracker comprises determining a confidence value associated with a determined gaze position being below a threshold value.

18. The method of claim 11, wherein determining the sub-optimal operational condition of the gaze dependent foveated rendering process comprises:
- determining a difference between a determined gaze position and a position of an object of interest in the content.

19. The method of claim 11, wherein the at least one parameter of the gaze dependent foveated rendering process relates to a rendering mode, wherein the rendering mode comprises at least one of:
- gaze dependent foveated rendering,
- non-gaze dependent foveated rendering,
- non-foveated rendering,
- binocular rendering,
- symmetric binocular rendering, or
- asymmetric binocular rendering.

20. A non-transitory computer readable medium encoded with instructions that, when performed by at least one processor, causes at least the following to be performed:
- determining a sub-optimal operational condition of a gaze dependent foveated rendering process;
- adapting the gaze dependent foveated rendering process in response to the determining of the sub-optimal operational condition of the gaze dependent foveated rendering process;
- wherein adapting the gaze dependent foveated rendering process comprises adjusting a position of at least one region of a display where content is rendered at a higher quality relative to content rendered in at least one other region of the display at a lower quality;
- wherein adapting the gaze dependent foveated rendering process comprises controlling at least one parameter of the gaze dependent foveated rendering process;
- wherein controlling the at least one parameter comprises controlling an adjustment rate of the position of the at least one region of the display where content is rendered at the higher quality is adjusted so that the adjustment is less perceivable to a user of the apparatus.

* * * * *